May 28, 1957  G. B. DUNN, JR  2,794,138
CLOSED SLOT ROTOR PUNCHING
Filed May 27, 1954

Inventor:
George B. Dunn Jr.,
by *Robert G. Irish*
His Attorney.

United States Patent Office 2,794,138
Patented May 28, 1957

2,794,138
CLOSED SLOT ROTOR PUNCHING

George B. Dunn, Jr., Zanesville, Ind., assignor to General Electric Company, a corporation of New York Application May 27, 1954, Serial No. 432,828

5 Claims. (Cl. 310—211)

This invention relates to electric motors and more particularly to an improved closed slot rotor punching for use in induction motors.

Alternating current induction motors have a rotor construction wherein, generally, a group of punchings, or laminations are stacked together so that the slots of each punching are aligned with the slots of the neighboring punching. These slots are usually located at or near the rim of the punching, so that when the rotor is assembled into a motor the contents of the slots will be close to the air gap which is maintained between the rotor and the surrounding stator. Windings of any desired type are placed in the slots, and are all shorted together, by end rings for instance, at each end of the stack of punchings which makes up the rotor.

It is well known that, by using closed slots in the rotor of an alternating current induction motor, the permeance variations can be minimized and the motor noise can be lessened. Both of these factors are, however, dependent not only upon having the slot opening closed but also upon the precise manner of closing it. A properly shaped closure for the slot will bring these factors within highly satisfactory limits and, in addition, reduce the load loss of the motor and provide a slight reduction in the magnetizing current needed. The tops of closed slots have in the past generally been rounded in the belief that undesirable factors could be kept to a minimum by such a shape. However, a rounded top will not provide for a substantially even flux density in that portion of the rotor punching which is above the top of the slot. It has been discovered that the development of the factors discussed above depends to a very great extent upon maintaining the flux density constant in this area.

An object of this invention is therefore, to provide a closed slot rotor punching which will incorporate the desirable features discussed above.

Further objects and advantages of this invention will become apparent and the invention will be better understood by reference to the following description and the accompanying drawing; and the features of novelty which characterize this invention will be pointed out with particularity in the claims annexed to and forming a part of this specification.

This invention, in its broadest aspects, provides a closed slot rotor punching wherein the top of the slot is substantially V shaped, with the legs of the V being slanted away from the edge of the punching.

Figure 1:
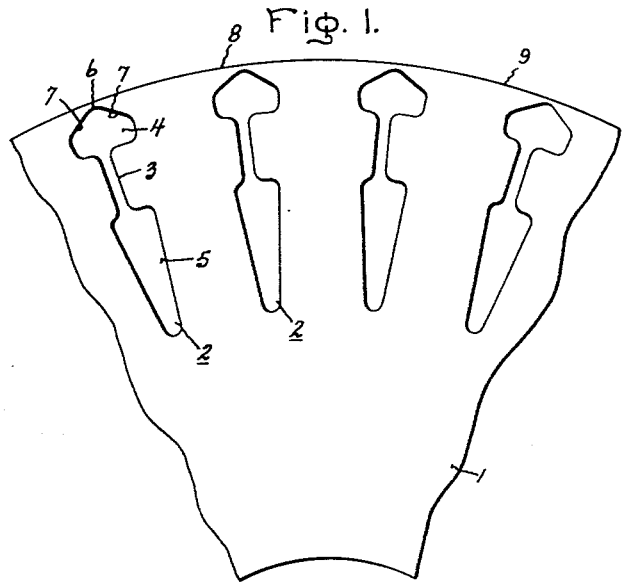
Figure 2:
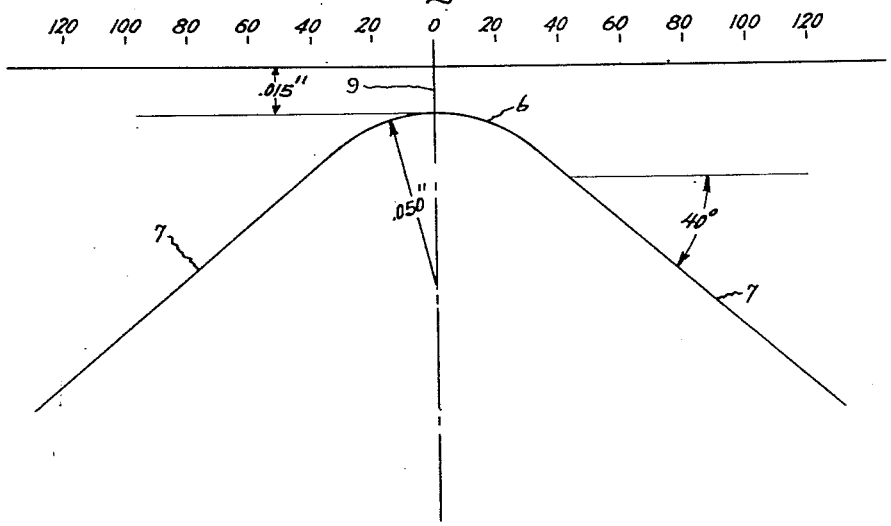

In the drawing, Figure 1 is a fragmentary front view of the improved closed slot rotor punching of this invention; and Figure 2 graphically illustrates the exact specifications for the shape of the top of the rotor slot.

Referring now to Figure 1 of the drawing, there is shown part of a rotor punching or lamination 1 having equispaced squirrel cage conductor slots 2 formed therein. In the present embodiment slots 2 have a narrow neck portion 3 which joins a wider top portion 4 and a somewhat triangular bottom portion 5 of the slot. The entire slot opening in the present embodiment is adapted to be filled with a cast aluminum winding. It will, however, be understood that the shape of parts 3 and 5 is not critical, and may vary as desired. For instance, the slot 2 might come straight down from part 4 and terminate without any variations in dimensions, and, in addition to having a cast winding therein, may in the alternative have separate rotor bars or a wound winding.

The top of slot 2 is closed by a brief central curved bridge portion 6 which merges into two straight side portions 7. It has been found that it is preferable to leave a minimum distance of .015 inch between curved portion 6 and the edge 8 of the rotor punching in motors of the small integral horsepower type, but this dimension will, of course, vary with the size of the motor. The desirability for this minimum distance arises from manufacturing considerations and it will be understood that it may be varied without departing from the spirit of the invention.

Referring now to Figure 2, the abscissa is shown graduated in thousandths of an inch. It will be understood that although the abscissa is actually curved, the curvature is so slight that it has been shown as a straight line tangential to the curved edge of the punching at a point in the radial line with the center of curved portion 6. It will be seen that in the present embodiment the curved section 6 has a radius of .050 inch. This has been found to give optimum results but again it will be understood that departures from this value may be made without impairing the value of this invention. It will also be understood that this section need not necessarily be an arc of a circle, but may be given any shape which will join lines 7 and bring about a bridge portion of the desired width. The curved portion 6 blends into straight portion 7 at each side at a distance of approximately .025 inch from the centerline of the slot. Again, this value may be varied although it is preferable to have the top of the slot extend in a straight line, as at 7, at distances greater than .025 inch from the center line of the slot. In the present embodiment side 7 of the top of the slot descends at an angle of 40 degrees relative to the abscissa. This value is variable as will be shown later, and may be precisely determined for any different type of motor. It will further be noted that in the preferred embodiment shown, lines 7 will intersect at substantially the zero point when extended. Such a structure facilitates the computations (explained below) for determining the slope of lines 7.

The considerations involving the different dimensions will now be explained. The main criterion that must be met is that magnetizing flux crossing the air gap and entering the rotor must not saturate the narrow bridge portion 9 between the top of the slot and the air gap, since saturation by the magnetizing flux would prevent any electrical advantage in the use of a closed slot. Narrow bridge portion 9 should, however, be saturated by the leakage flux set up by the current in the rotor windings. The density of this flux should, for optimum performance, drop from a high value at the center of the slot to a relatively low value immediately thereafter. Conversely, the air gap magnetizing flux density should climb from zero at the center of the slot to a relatively constant value immediately thereafter, and should stay at that value out to the ends of the slot. This will mean that although the bridge at the center of the slot may become highly saturated with leakage flux, this will not be true away from the center of the slot. It is because of the fact that the air gap magnetizing flux must go to one side or the other of the center of the slot that the top of the slot may be curved as at 6, since there will be practically no air gap magnetizing flux above the curved portion. The considerations which have brought forth straight portions 7 will not be present, and portion 6 may be curved so as to obviate the presence of undesirable sharp angles, and to preserve the desired distance between curved portion 6 and the outer edge 8 of the rotor punching.

If now it be assumed that $\phi$ equals the total air gap flux in the space above the top of the slot; L equals the length of a stack of laminations, such as that indicated in Figure 1 by numeral 1; $Bg$ equals the density of the flux in the air gap; $\theta$ equals the electrical degrees from zero out to any given point along the abscissa; Y equals the vertical distance along the ordinate as shown in Figure 2; and X equals any distance along the abscissa, it becomes a relatively simple matter to find $Bx$, which is the air gap flux density in the space above any given point on the top of the slot. It is well known that $\phi$ may be found by the formula $\phi = LXBg$ sine $\theta$. Since the sine of $\theta$ in this case is so large as to be practically unity it will henceforth be ignored in this formulation. Thus $\phi = LXBg$. Since the air gap flux density above the slot will be the total flux divided by the area over which it is spread, at any point along the top of the slot $Bx$ will equal $\phi/YL$. This will in turn equal $LXBg/YL$. The final formula will then become $Bx = BgX/Y$. Since $Bg$ will remain, in essence, a constant over the span of the slot, $Bx$ will then vary directly as $X/Y$. To maintain $Bx$ at a constant value (the desired goal) it will be seen that parts 7 of Figures 1 and 2 will, of necessity, be straight lines. The angle at which line 7 will descend will depend upon the value of the constant $Bg$ for a given $Bx$, that is, the steeper line 7 is made the smaller $Bx$ will be. Thus, it is mathematically clear that to keep the air gap flux density in the space above the top of slot 2 constant lines 7 should be straight as they are shown, with the angle which is shown as 40° in Figure 2 varying with the constant value of $Bg$.

It will be seen from the above that this invention provides a closed slot of such a type that core loss, load loss, noise and magnetizing current are minimized and that this result is achieved in an orderly fashion whereby a slot may be designed to give any motor the optimum results.

While this invention has been explained by describing a particular embodiment thereof it will be apparent that improvements and modifications may be made without departing from the scope of the invention as defined in the appended claims.

What I claim as new and desire to secure by Letters Patent of the United States is:

1. In a dynamoelectric machine, a rotor punching having a plurality of closed slots, each of said slots having a substantially inverted V-shaped top, the legs of said V being formed as straight lines slanted away from the edge of said punching at substantially equal angles to a line drawn tangentially to the edge of said punching at a point in a radial line with the center of the top of said slot, said legs being arranged so that when extended they intersect at said point.

2. In a dynamoelectric machine, a rotor punching having a plurality of closed slots, each of said slots having a substantially inverted V-shaped top, the center of said V being curved, and the legs of said V being formed as straight lines slanted away from the edge of said punching at an angle such that the density of flux above said top due to air gap magnetizing flux is substantially constant throughout the length of said legs said angle being determined with respect to a line drawn tangentially to the edge of said punching at a point in a radial line with the center of said curved portion, said legs being arranged so that when extended, they intersect at said point.

3. In a dynamoelectric machine, a rotor punching having a plurality of closed slots and a bridge area between the top of each of said slots and the edge of said punching, each of said slots having an inverted substantially V-shaped top, the center of said V being curved and being at a distance on the order of 0.015 inch from the edge of said punching, said curved portion being formed as an arc of a circle having a radius on the order of 0.050", the legs of said V being formed as straight lines slanted away from the edge of said punching at angles on the order of 40° to a line drawn tangentially to the edge of said punching at a point in a radial line with the center of said curved portion, said legs being arranged so that when extended they intersect at said point.

4. In a dynamoelectric machine, a rotor punching having a plurality of closed slots each of said slots having an inverted substantially V-shaped top, the center of said V being curved and forming the narrowest portion of said bridge, the legs of said V being formed as straight lines slanted away from a line drawn tangentially to the edge of said punching at a point in a radial line with the center of said curved portion at a slant determined by the formula $Y = XBg/Bx$ where Y is the distance from the top of said slot to the edge of said punching, X is the distance along the edge of said punching from the center of said slot, $Bg$ is the density in the airgap at X, and $Bx$ is the airgap flux density in said punching at X.

5. In a dynamoelectric machine, a rotor punching having a plurality of closed slots, each of said slots having an inverted substantially V-shaped top, the legs of said V being formed as straight lines slanted away from a line drawn tangentially to the edge of said punching at a point in a radial line with the center of said V at a slant determined by the formula $Y = XBg/Bx$ where Y is the distance from the top of said slot to the edge of said punching, X is the distance along the edge of said punching from the center of said slot, $Bg$ is the density of the flux in the airgap at X, and $Bx$ is the airgap flux density in said punching at X.

References Cited in the file of this patent

UNITED STATES PATENTS

| | | |
|---|---|---|
| 1,554,702 | Bergman | Sept. 22, 1925 |
| 1,610,816 | Rutherford | Dec. 14, 1926 |
| 1,915,115 | Baker | June 20, 1933 |
| 2,048,421 | Ballentine | July 21, 1936 |
| 2,067,605 | Griffin | Jan. 12, 1937 |